US011683591B2

(12) United States Patent
Furuta

(10) Patent No.: US 11,683,591 B2
(45) Date of Patent: Jun. 20, 2023

(54) IMAGING APPARATUS, IMAGING METHOD, AND IMAGING PROGRAM

(71) Applicant: FUJIFILM Corporation, Tokyo (JP)

(72) Inventor: Yoshinori Furuta, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 17/670,663

(22) Filed: Feb. 14, 2022

(65) Prior Publication Data
US 2022/0166913 A1 May 26, 2022

Related U.S. Application Data

(63) Continuation of application No. PCT/JP2020/023762, filed on Jun. 17, 2020.

(30) Foreign Application Priority Data

Aug. 27, 2019 (JP) .............................. JP2019-154882

(51) Int. Cl.
H04N 23/73 (2023.01)
H04N 23/745 (2023.01)

(52) U.S. Cl.
CPC ........... H04N 23/73 (2023.01); H04N 23/745 (2023.01)

(58) Field of Classification Search
CPC .... H04N 23/73; H04N 23/745; H04N 23/667; H04N 25/53; H04N 23/665; H04N 23/00; H04N 25/531
See application file for complete search history.

(56) References Cited

U.S. PATENT DOCUMENTS 8,300,131 B2 * 10/2012 Kawai .................... G03B 7/091
348/311
9,300,945 B2 * 3/2016 Seo ......................... G03B 35/06
(Continued)

FOREIGN PATENT DOCUMENTS

| JP | 2005-260733 A | 9/2005 |
| JP | 2010-161572 A | 7/2010 |
| JP | 2012-129817 A | 7/2012 |

OTHER PUBLICATIONS

International Preliminary Report on Patentability and English translation of the Written Opinion of the international Searching Authority for International Application No. PCT/JP2020/023762. dated Mar. 10, 2022.

(Continued)

Primary Examiner — Ahmed A Berhan
(74) Attorney, Agent, or Firm — Birch, Stewart, Kolasch & Birch, LLP

(57) ABSTRACT

An imaging apparatus includes: a controller that performs first synchronization control of outputting a first synchronization signal at a first timing after receiving an instruction of continuous imaging, outputting a second synchronization signal at a second timing after elapse of a first time period from the first timing, and outputting the second synchronization signal every time a second time period longer than the first time period elapses after the second timing; and an imaging unit that starts reading of a signal from an imaging element by a rolling shutter method at a third timing at which an input of the second synchronization signal is received after the second timing, and starts exposure of the imaging element by the rolling shutter method at a fourth timing before the third timing so that an interval between the fourth and third timings is equal to a length of an exposure time period.

31 Claims, 8 Drawing Sheets

(56) References Cited

U.S. PATENT DOCUMENTS

| | | |
|---|---|---|
| 9,729,773 B2 * | 8/2017 | Imamura ................ H04N 23/55 |
| 2005/0200744 A1 | 9/2005 | Kobayashi |
| 2009/0096902 A1 | 4/2009 | Kobayashi |

OTHER PUBLICATIONS

International Search Report for International Application No. PCT/JP2020/023762 dated Sep. 15, 2020, with English translation.

* cited by examiner

IMAGING APPARATUS, IMAGING METHOD, AND IMAGING PROGRAM

CROSS REFERENCE TO RELATED APPLICATION

This is a continuation of International Application No. PCT/JP2020/023762 filed on Jun. 17, 2020, and claims priority from Japanese Patent Application No. 2019-154882 filed on Aug. 27, 2019, the entire disclosures of which are incorporated herein by reference.

BACKGROUND OF THE INVENTION

1. Field of the Invention

The present invention relates to an imaging apparatus, an imaging method, and a computer readable medium storing an imaging program.

2. Description of the Related Art

Recently, there has been a rapid increase in the demand for electronic devices having imaging functions such as digital still cameras, digital video cameras, or electronic devices (for example, smartphones) equipped with cameras in accordance with an increase in resolution of imaging elements such as charge coupled device (CCD) image sensors and complementary metal oxide semiconductor (CMOS) image sensors.

As a driving method of a CMOS type imaging element mounted on an electronic device, driving in the rolling shutter method is known. The driving of the rolling shutter method is a method of sequentially performing driving for resetting each photoelectric conversion element of a pixel row of the imaging element to start exposure of the pixel row and then reading, to a signal line, a pixel signal corresponding to charge accumulated in each photoelectric conversion element of the pixel row while changing the pixel row.

JP2005-260733A describes, as a method of driving a CCD image sensor, a method of reducing a shutter time lag by resetting a vertical synchronization operation and starting exposure in a case where an imaging instruction is received.

As a driving method of the CMOS image sensor, JP2012-129817A describes that the exposure is started by forcibly applying a vertical synchronization signal asynchronously without waiting for the next vertical synchronization signal and performing a global reset (simultaneous reset of all the pixels), in a case where a still image imaging start trigger is input.

SUMMARY OF THE INVENTION

One embodiment according to the technique of the present disclosure provides an imaging apparatus, an imaging method, and a computer readable medium storing an imaging program capable of reducing a shutter time lag.

An imaging apparatus of the present invention comprises: a controller that performs first synchronization control of outputting a first synchronization signal at a first timing after receiving an instruction of continuous imaging, outputting a second synchronization signal at a second timing after elapse of a first time period from the first timing, and outputting a second synchronization signal every time the second time period longer than the first time period elapses after the second timing; and an imaging unit that starts reading of a signal from an imaging element by a rolling shutter method at a timing at which an input of the second synchronization signal is received after the second timing, and starts exposure of the imaging element by the rolling shutter method at a timing before an exposure time period of the timing at which the input of the second synchronization signal is received.

An imaging method of the present invention comprises: a control step of performing first synchronization control of outputting a first synchronization signal at a first timing after receiving an instruction of continuous imaging, outputting a second synchronization signal at a second timing after elapse of a first time period from the first timing, and outputting the second synchronization signal every time a second time period longer than the first time period elapses after the second timing; and an imaging step of starting reading of a signal from an imaging element by a rolling shutter method at a timing at which an input of the second synchronization signal is received after the second timing, and starting exposure of the imaging element by the rolling shutter method at a timing before an exposure time period of the timing at which the input of the second synchronization signal is received.

An imaging program of the present invention causes a computer to execute: a control step of performing first synchronization control of outputting a first synchronization signal at a first timing after receiving an instruction of continuous imaging, outputting a second synchronization signal at a second timing after elapse of a first time period from the first timing, and outputting the second synchronization signal every time a second time period longer than the first time period elapses after the second timing; and an imaging step of starting reading of a signal from an imaging element by a rolling shutter method at a timing at which an input of the second synchronization signal is received after the second timing, and starting exposure of the imaging element by the rolling shutter method at a timing before an exposure time period of the timing at which the input of the second synchronization signal is received.

According to the present invention, it is possible to provide an imaging apparatus, an imaging method, and an imaging program capable of reducing the shutter time lag.

DESCRIPTION OF THE PREFERRED EMBODIMENTS

Hereinafter, embodiments of the present invention will be described, with reference to the drawings.

Figure 1:
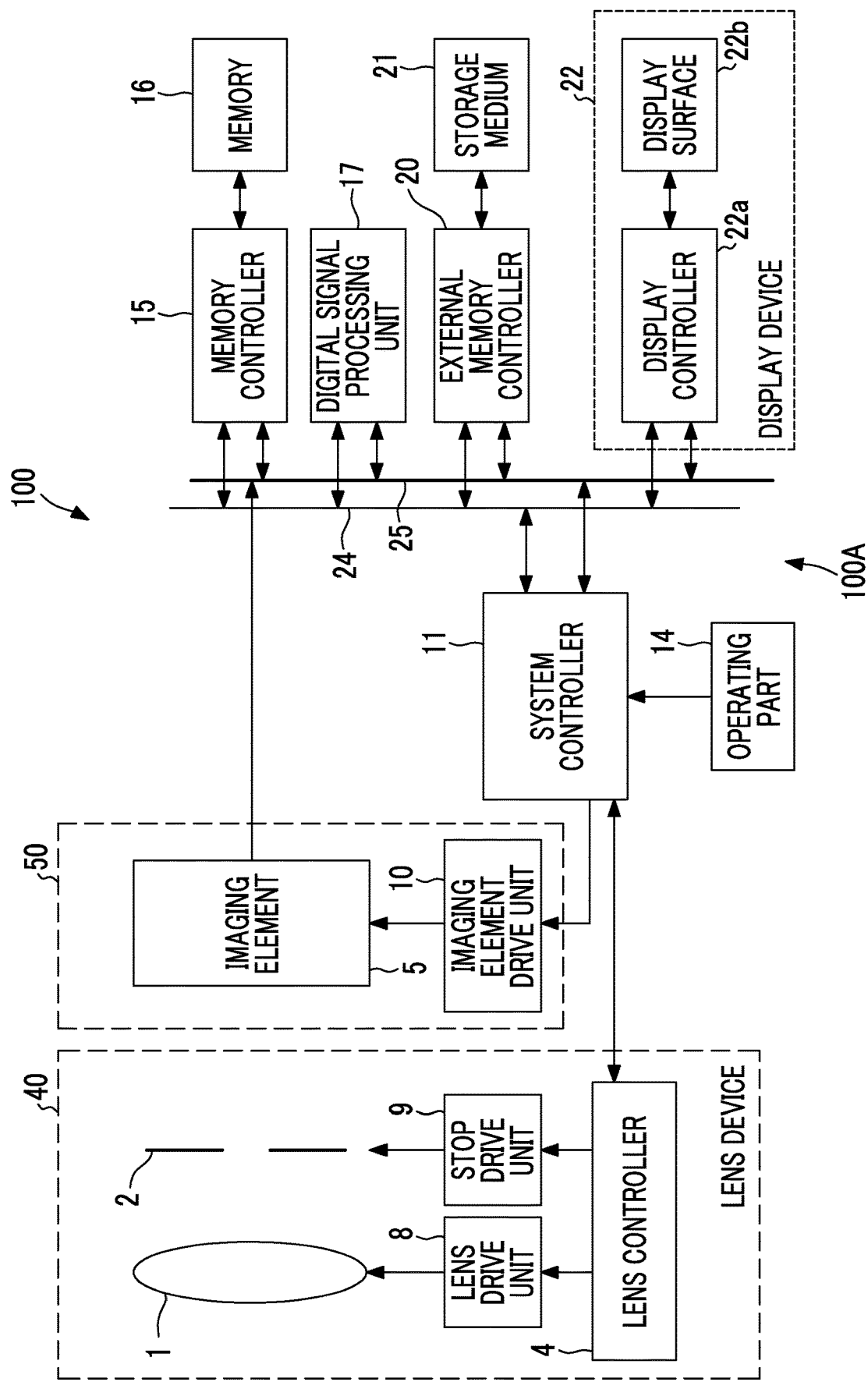
FIG. 1 is a diagram showing a schematic configuration of a digital camera 100 as an electronic device including an embodiment of an imaging apparatus of the present invention.

FIG. 1 is a diagram showing a schematic configuration of a digital camera 100 as an electronic device including an embodiment of an imaging apparatus of the present invention.

The digital camera 100 shown in FIG. 1 comprises a lens device 40 having an imaging lens 1, a stop 2, a lens controller 4, a lens drive unit 8, and a stop drive unit 9, and a body part 100A. The body part 100A comprises: an imaging unit 50; a system controller 11; an operating part 14; a display device 22; a memory 16 including a random access memory (RAM) and a read only memory (ROM); a memory controller 15 that controls data recording to the memory 16 and data reading from the memory 16; a digital signal processing unit 17; and an external memory controller 20 that controls data recording to a storage medium 21 and data reading from the storage medium 21. The imaging apparatus is composed of the imaging unit 50 and the system controller 11.

The lens device 40 may be attachable to and detachable from the body part 100A, or may be integrated with the body part 100A. The imaging lens 1 includes a focus lens, a zoom lens, and the like movable in the optical axis direction. The lens controller 4 of the lens device 40 is configured to be able to communicate with the system controller 11 of the body part 100A by wire or wirelessly. The lens controller 4 controls the focus lens included in the imaging lens 1 through the lens drive unit 8 to change a position of a principal point of the focus lens, controls the zoom lens included in the imaging lens 1 through the lens drive unit 8 to change a position (focal length) of the zoom lens, and controls a stop value of the stop 2 through the stop drive unit 9, in accordance with a command from the system controller 11.

The imaging unit 50 comprises a CMOS type imaging element 5 that captures an image of a subject through an imaging optical system including an imaging lens 1 and a stop 2, and an imaging element drive unit 10 that drives the imaging element 5.

The imaging element 5 has an imaging surface in which a plurality of pixels are two-dimensionally arranged, and the plurality of pixels converts a subject image, which is formed on the imaging surface by the imaging optical system, into a pixel signal, and outputs the signal. Hereinafter, a set of pixel signals, which are output from each pixel of the imaging element 5, is referred to as a captured image signal.

The system controller 11, which integrally controls the entire electric control system of the digital camera 100, outputs a subject image captured through the imaging optical system of the lens device 40, as a captured image signal, by driving the imaging element 5 through the imaging element drive unit 10.

The imaging element drive unit 10 drives the imaging element 5 by generating a drive signal on the basis of a command from the system controller 11 and supplying the drive signal to the imaging element 5. The imaging element drive unit 10 is an electric circuit having a hardware-like configuration in which circuit elements such as semiconductor elements are combined.

An instruction signal from a user is input to the system controller 11 through the operating part 14. The operating part 14 includes a touch panel integrated with a display surface 22b to be described later, various buttons, and the like.

The system controller 11 integrally controls the entire digital camera 100, and the hardware structure is various processors that execute programs including an imaging program to perform processing. The program executed by the system controller 11 is stored in the ROM of the memory 16.

Various kinds of processors include a central processing unit (CPU) as a general-purpose processor that performs various kinds of processing by executing programs, a programmable logic device (PLD) that is a processor capable of changing a circuit configuration after manufacturing such as a field programmable gate array (FPGA), a dedicated electric circuit that is a processor having a circuit configuration designed exclusively for executing specific processing of an application specific integrated circuit (ASIC), or the like. More specifically, a structure of these various processors is an electric circuit in which circuit elements such as semiconductor elements are combined.

The system controller 11 may be configured as one of various processors, or may be configured as a combination of two or more of the same or different kinds of processors (for example, a combination of a plurality of FPGAs or a combination of a CPU and an FPGA).

The display device 22 comprises a display surface 22b composed of an organic electroluminescence (EL) panel, a liquid crystal panel, or the like, and a display controller 22a that controls display of the display surface 22b.

The memory controller 15, the digital signal processing unit 17, the external memory controller 20, and the display controller 22a are connected to one another through the control bus 24 and the data bus 25, and are controlled through a command from the system controller 11.

Figure 2:
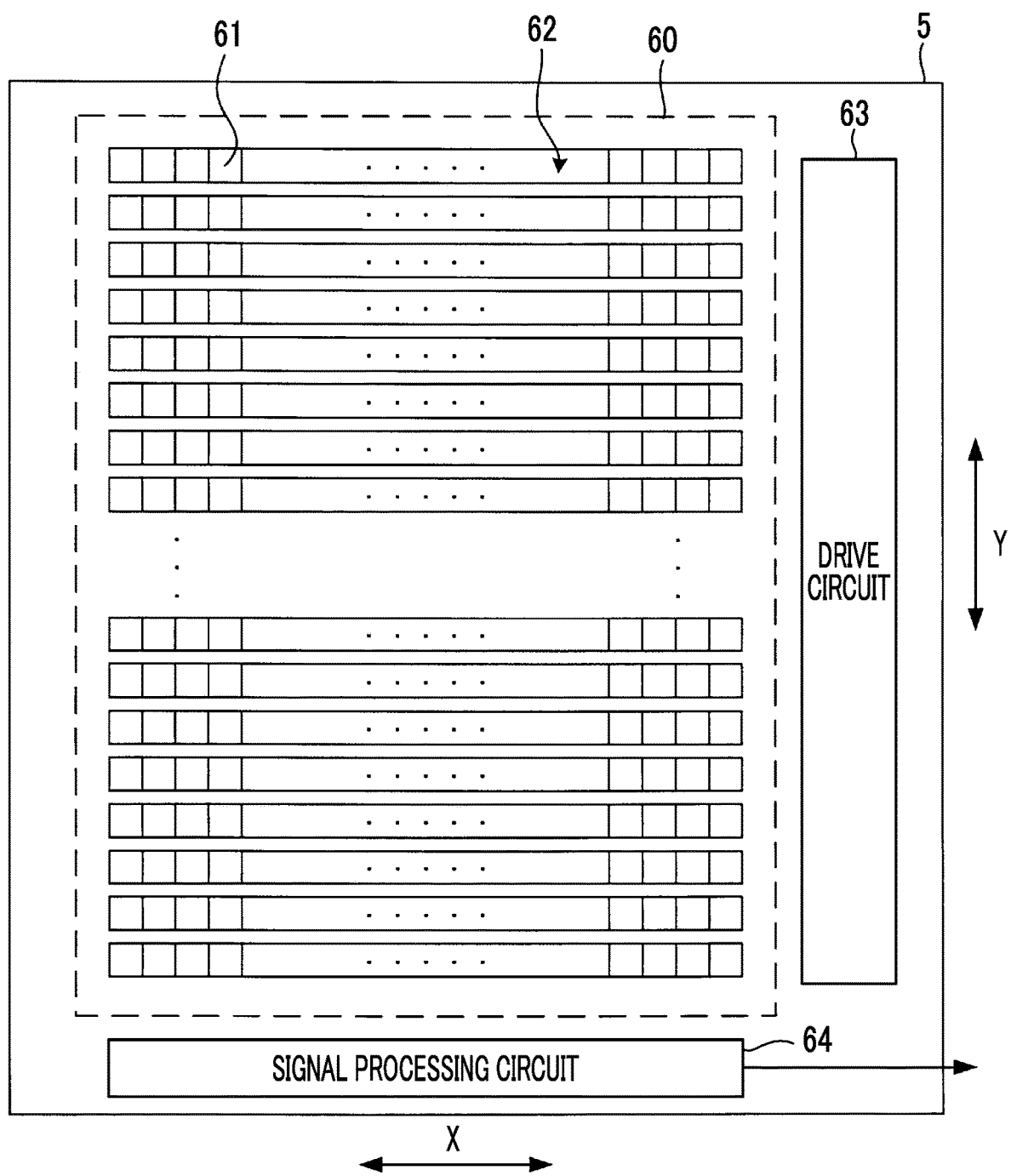
FIG. 2 is a schematic plan view showing a schematic configuration of the imaging element 5 shown in FIG. 1.

FIG. 2 is a schematic plan view showing a schematic configuration of the imaging element 5 shown in FIG. 1.

The imaging element 5 comprises: an imaging surface 60 on which a plurality of pixel rows 62 each consisting of a plurality of pixels 61 arranged in a row direction X are arranged in a column direction Y orthogonal to the row direction X; a drive circuit 63 that drives the pixels 61 arranged on the imaging surface 60; and a signal processing circuit 64 that processes a pixel signal which is read to a signal line from each pixel 61 of the pixel rows 62 arranged on the imaging surface 60. The imaging surface 60 constitutes a light-receiving surface.

In the following, in FIG. 2, the end part of the imaging surface 60 on one end side (upper side in the drawing) thereof in the column direction Y is referred to as the upper end, and the end part of the imaging surface 60 on the other end side (lower side in the drawing) thereof in the column direction Y is referred to as the lower end.

The drive circuit 63 shown in FIG. 2 independently drives each pixel row 62 on the basis of the signal from the imaging element drive unit 10 to perform reset of each pixel 61 included in the pixel row 62 (discharge of the charge accumulated in the photoelectric conversion element), reading of the pixel signal to the signal line in accordance with the charge accumulated in the photoelectric conversion element of each pixel 61, and the like.

The signal processing circuit 64 shown in FIG. 2 performs correlation double sampling processing on the pixel signal, which is read to the signal line from each pixel 61 of the pixel row 62, to convert the pixel signal after the correlation double sampling processing into a digital signal, and outputs the digital signal to the data bus 25. The signal processing circuit 64 is controlled by the imaging element drive unit 10.

The digital signal processing unit 17 generates captured image data by performing signal processing such as demosaic processing and gamma correction processing on the pixel signal which is output from the imaging element 5 to the data bus 25.

The digital camera 100 is equipped with a continuous imaging mode in which a plurality of captured image data pieces are continuously generated and recorded on the storage medium 21 in response to one imaging instruction.

The system controller 11 functions as a controller by executing a program including an imaging program recorded in the ROM of the memory 16.

In the continuous imaging mode, the system controller 11 drives the imaging element 5 by the imaging element drive unit 10 by the rolling shutter method to capture an image of a subject. The system controller 11 is able to also drive a mechanical shutter (not shown) to capture an image of the subject in the continuous imaging mode.

The driving of the rolling shutter method includes rolling reset driving and rolling read driving. The rolling reset driving is driving in which the processing of resetting each pixel 61 of the pixel row 62 and starting the exposure of each pixel 61 is sequentially performed while changing the pixel row 62. The rolling read driving is driving in which the processing of reading a signal from each pixel 61 of the exposed pixel row 62 and ending the exposure of the pixel row 62 is sequentially performed while changing the pixel row 62.

In the continuous imaging mode, the system controller 11 selects and executes either the first synchronization control or the second synchronization control on the basis of the imaging conditions such as the imaging sensitivity or the exposure value or the exposure time period determined by the setting from the user. Specifically, the system controller 11 selects and executes the first synchronization control in a case where the exposure time period is equal to or less than the threshold TH1, and selects and executes the second synchronization control in a case where the exposure time period is greater than the threshold TH1.

The exposure time period of the imaging element 5 may be distributed within the imaging surface 60 shown in FIG. 2, for example, in order to increase a dynamic range of the captured image data. For example, the exposure time period of the pixel rows 62 on the odd-numbered rows of the imaging surface 60 may be set to be different from the exposure time period of the pixel rows 62 on the even-numbered rows of the imaging surface 60. In such a case, a maximum value of the exposure time period of the pixel row 62 is an exposure time period used for selecting the first synchronization control and the second synchronization control.

Figure 3:
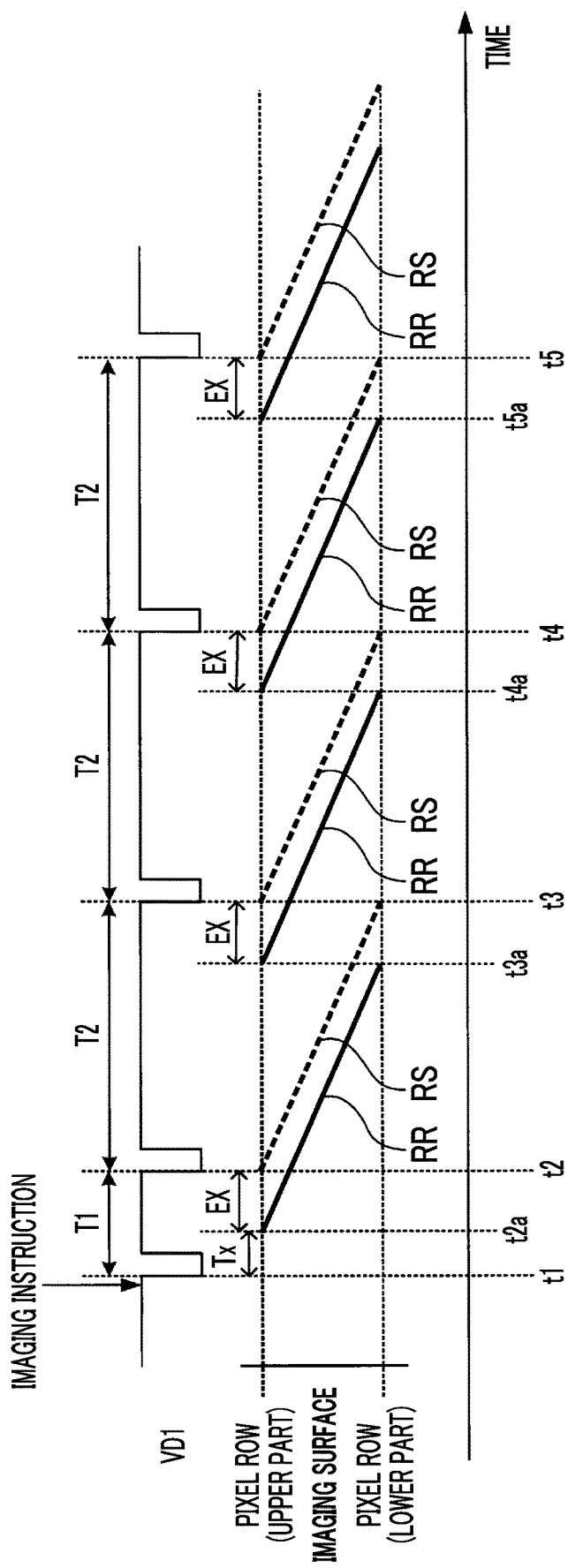
FIG. 3 is a diagram showing an example of a timing chart in a case where a system controller 11 performs first synchronization control in a continuous imaging mode of the digital camera 100 shown in FIG. 1.
Figure 4:
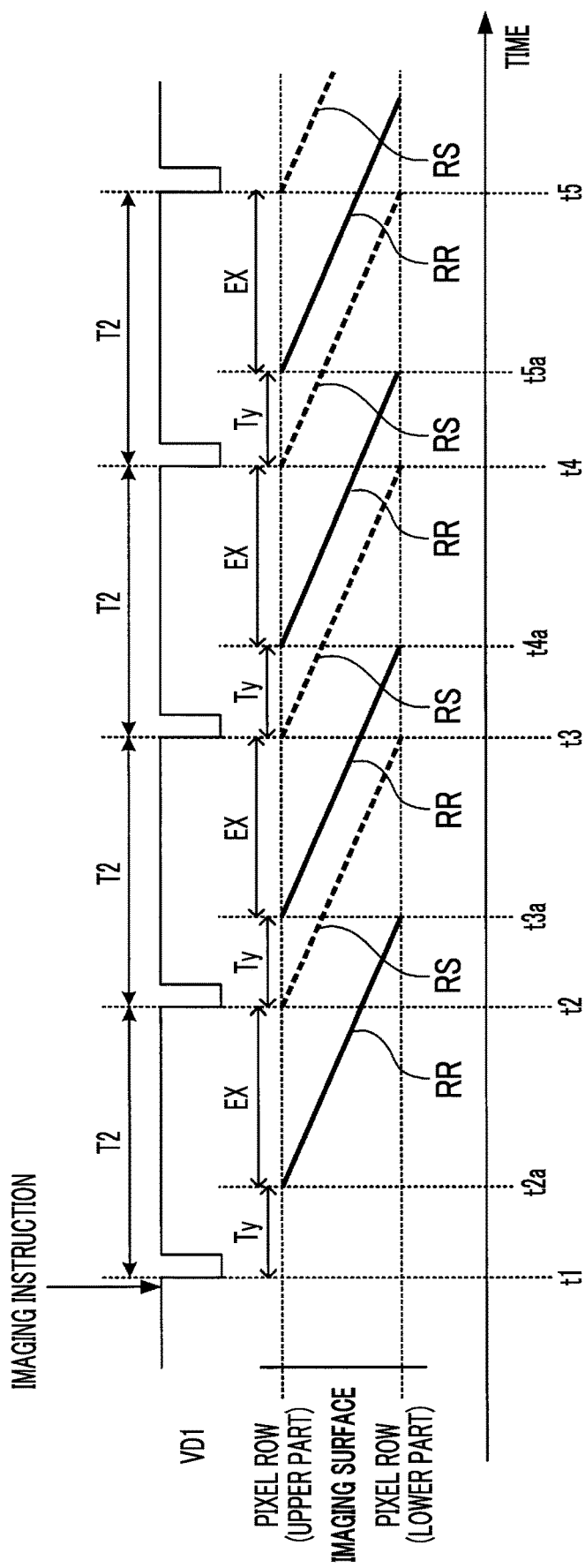
FIG. 4 is a diagram showing an example of a timing chart in a case where the system controller 11 performs second synchronization control in the continuous imaging mode of the digital camera 100 shown in FIG. 1.

FIG. 3 is a diagram showing an example of a timing chart in a case where the system controller 11 performs the first synchronization control in the continuous imaging mode of the digital camera 100 shown in FIG. 1. FIG. 4 is a diagram showing an example of a timing chart in a case where the system controller 11 performs the second synchronization control in the continuous imaging mode of the digital camera 100 shown in FIG. 1. FIGS. 3 and 4 each show an example in which four captured image data pieces are continuously acquired and recorded in the continuous imaging mode.

In FIGS. 3 and 4, the horizontal axis represents a time. The upper parts of FIGS. 3 and 4 each show a vertical synchronization signal VD1 which is generated and output by the system controller 11 and input to the imaging element drive unit 10 through a single signal line.

The lower parts of FIGS. 3 and 4 each show the drive timing of each pixel row 62 of the imaging element 5. In the lower parts of FIGS. 3 and 4, the vertical axis indicates a position of the pixel row 62 in the column direction Y. The straight line RR shown in each lower part of FIGS. 3 and 4 indicates a timing at which each pixel 61 included in the pixel row 62 is reset (exposure start) by the rolling reset driving. The straight line RS shown in each lower part of FIGS. 3 and 4 indicates a timing at which the exposure of each pixel 61 included in the pixel row 62 is completed by the rolling read driving. The period, which is surrounded by the straight line RR and the straight line RS on the right side, indicates an exposure time period EX of the imaging element 5 in the continuous imaging mode.

(First Synchronization Control)

As shown in FIG. 3, the system controller 11 outputs the vertical synchronization signal VD1 and the control information (the exposure start timing of pixel row 62, the signal amplification gain, and the like of each pixel row) at a time point t1 which is a first timing immediately after receiving the instruction of continuous imaging (imaging instruction in FIG. 3).

In a case where the imaging element drive unit 10 receives the input of the vertical synchronization signal VD1 and the control information, the imaging element drive unit 10 reflects the control information in the drive circuit 63 and the signal processing circuit 64. In a case where the reflection of the control information is completed, the imaging element drive unit 10 starts rolling reset driving (exposure of the imaging element 5) at the time point t2a after the input of the vertical synchronization signal VD1 at the time point t1 is received and then a predetermined time period Tx elapses.

The system controller 11 outputs the vertical synchronization signal VD1 and an exposure start timing information of the second frame at the time point t2, which is a second timing after the elapse of a first time period T1 from the time point t1. The system controller 11 determines the timing after the exposure time period EX has elapsed as the second timing from the time point t2a at which the exposure of the imaging element 5 is started. That is, the system controller 11 determines a time period obtained by adding the exposure time period EX to the predetermined time period Tx as the first time period T1.

It is necessary for the predetermined time period Tx to be longer than the processing time required until the control information is output from the system controller 11 and the control information is reflected in the imaging element 5. The processing time increases as the processing load of the imaging unit 50 and the system controller 11 increases. Therefore, the system controller 11 determines a lower limit value (the above-mentioned processing time) of the predetermined time period Tx on the basis of the processing load of the imaging unit 50 and the system controller 11. As described above, the first time period T1 is a value controlled on the basis of the processing load of the imaging unit 50 and the system controller 11 and the exposure time period EX.

The imaging element drive unit 10 starts rolling read driving (signal reading from the imaging element 5) at a timing of receiving an input of the vertical synchronization signal VD1 which is output at the time point t2 at which the exposure time period EX has elapsed from the time point t2a.

After the time point t2, the system controller 11 outputs the vertical synchronization signal VD1 and the exposure start timing information every time the second time period T2 longer than the first time period T1 elapses (time points t3, t4, and t5 in FIG. 3). The second time period T2 is a value that is determined in advance depending on the number of continuous shots, settings, and the like.

The imaging element drive unit 10 starts the rolling read driving at the time point t2, then starts the rolling reset driving at the timing (time point t3a) according to the exposure timing information which is input from the system controller 11 at the time point t2, and starts the rolling read driving in a case where the vertical synchronization signal VD1 is input at the time point t3 at which the exposure time period EX has elapsed from the time point t3a.

The imaging element drive unit 10 starts the rolling read driving at the time point t3, then starts the rolling reset driving at the timing (time point t4a) according to the exposure timing information which is input from the system controller 11 at the time point t3, and starts the rolling read driving in a case where the vertical synchronization signal VD1 is input at the time point t4 at which the exposure time period EX has elapsed from the time point t4a.

The imaging element drive unit 10 starts the rolling read driving at the time point t4, then starts the rolling reset driving at the timing (time point t5a) according to the exposure timing information which is input from the system controller 11 at the time point t4, and starts the rolling read driving in a case where the vertical synchronization signal VD1 is input at the time point t5 at which the exposure time period EX has elapsed from the time point t5a.

In FIG. 3, the vertical synchronization signal VD1 which is output at the time point t1 is for instructing the imaging element drive unit 10 to prepare for the exposure of the first frame of continuous imaging, and constitutes the first synchronization signal. In FIG. 3, the vertical synchronization signal VD1 which is output after the time point t1 is for instructing the imaging element drive unit 10 to read the signal obtained in each exposure of continuous imaging, and constitutes the second synchronization signal.

As described above, in the first synchronization control, an interval (first time period T1) between the vertical synchronization signal VD1, which is output first, and the vertical synchronization signal VD1, which is output second after receiving the instruction of continuous imaging, is shorter than an interval between the vertical synchronization signals VD1 which are output after the second (second time period T2).

(Second Synchronization Control)

As shown in FIG. 4, the system controller 11 outputs the vertical synchronization signal VD1 and the control information at the time point t1 after receiving the instruction of continuous imaging (imaging instruction in FIG. 4). After the time point t1, the system controller 11 outputs the vertical synchronization signal VD1 and the exposure start timing information every time the second time period T2 elapses (time points t2, t3, t4, and t5 in FIG. 4).

In a case where the imaging element drive unit 10 receives the input of the vertical synchronization signal VD1 and the control information which is output at the time point t1, the control information is reflected in the drive circuit 63 and the signal processing circuit 64. In a case where the reflection of the control information is completed, the imaging element drive unit 10 starts the rolling reset driving (exposure of the imaging element 5) at the time point t2a after elapse of a predetermined time period Ty from the time point t1. The predetermined time period Ty is set to a value which is obtained by subtracting the exposure time period EX from the second time period T2.

The imaging element drive unit 10 starts rolling read driving (signal reading from the imaging element 5) at a timing of receiving an input of the vertical synchronization signal VD1 which is output at the time point t2 at which the exposure time period EX has elapsed from the time point t2a.

The imaging element drive unit 10 starts the rolling reset driving at the timing (time point t3a) after the elapse of the predetermined time period Ty from the time point t2, and starts the rolling read driving in a case of receiving the input of the vertical synchronization signal VD1 at the time point t3 at which the exposure time period EX elapses from the time point t3a.

The imaging element drive unit 10 starts the rolling reset driving at the timing (time point t4a) after the elapse of the predetermined time period Ty from the time point t3, and starts the rolling read driving in a case of receiving the input of the vertical synchronization signal VD1 at the time point t4 at which the exposure time period EX elapses from the time point t4a.

The imaging element drive unit 10 starts the rolling reset driving at the timing (time point t5a) after the elapse of the predetermined time period Ty from the time point t4, and starts the rolling read driving in a case of receiving the input of the vertical synchronization signal VD1 at the time point t5 at which the exposure time period EX elapses from the time point t5a.

In FIG. 4, the vertical synchronization signal VD1 which is output at the time point t1 is for instructing the imaging element drive unit 10 to prepare for the exposure of the first frame of continuous imaging, and constitutes the first synchronization signal. In FIG. 4, the vertical synchronization signal VD1 which is output after the time point t1 is for instructing the imaging element drive unit 10 to read the signal obtained in each exposure of continuous imaging, and constitutes the second synchronization signal.

As described above, in the second synchronization control, in a case where the instruction of continuous imaging is received, the vertical synchronization signal VD1 is output from the system controller 11 at regular intervals (every second time period T2).

(Effect of Digital Camera of Embodiment)

In the digital camera 100, in the continuous imaging mode, the first synchronization control shown in FIG. 3 and the second synchronization control shown in FIG. 4 are selectively executed. In the first synchronization control shown in FIG. 3, a time period from the instruction of imaging to the start of the exposure of the first frame (predetermined time period Tx), that is, the so-called shutter time lag, can be shorter than a time period (predetermined time period Ty) which is the same in the second synchronization control shown in FIG. 4. For example, in the continuous imaging mode, in a case where only the second synchronization control shown in FIG. 4 is performed, the shorter the exposure time period EX, the longer the shutter time lag. Therefore, in a case where the exposure time period EX is short (in a case where it is equal to or less than the threshold value), the first synchronization control can be performed to prevent an increase in the shutter time lag which becomes remarkable in a case where the exposure time period EX is short.

(First Modification Example of Digital Camera of Embodiment)

In the modification example, the system controller 11 functions as a flicker detection unit that detects flicker (blinking of a light source such as a fluorescent lamp or a mercury lamp). The method of detecting flicker is not particularly limited.

In a case where the system controller 11 detects flicker in the continuous imaging mode, the system controller 11 executes the second synchronization control, which is shown in FIG. 4, as the synchronization control performed in response to the instruction of continuous imaging, regardless of the exposure time period EX. Further, the system controller 11 performs control for setting the second time period T2 in the second synchronization control as a time period (for example, a natural number times a period of blinking of a light source causing flicker) for suppressing image quality deterioration (occurrence of luminance unevenness between captured image data pieces) caused by the flicker.

As described above, in a case where the system controller 11 detects the flicker and drives the imaging element 5 under the driving conditions for preventing the image quality deterioration caused by the flicker, even though the exposure time period EX is equal to or less than the threshold value, the second synchronization control shown in FIG. 4 is performed. According to the configuration, a state of overlapping between the exposure period of each frame of continuous imaging and the blinking pattern of the light source can be made uniform. As a result, it is possible to prevent a change in brightness in each captured image data obtained by continuous imaging.

(Second Modification Example of Digital Camera of Embodiment)

Figure 5:
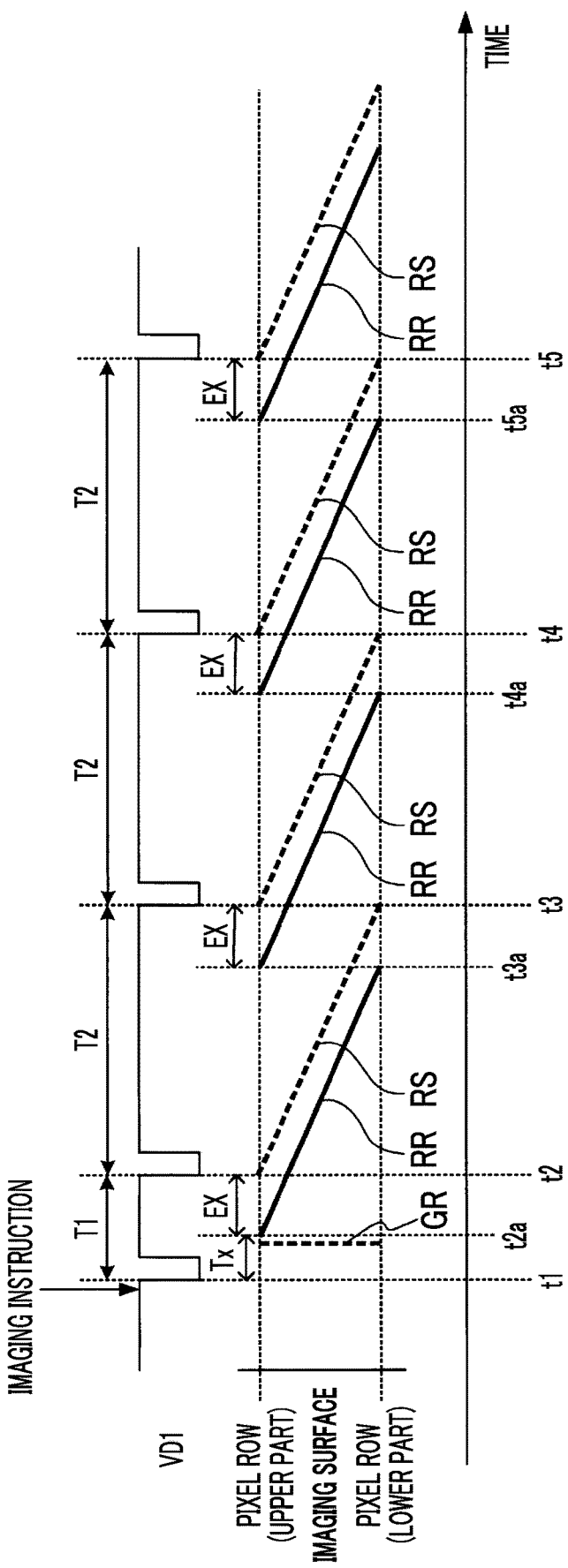
FIG. 5 is a timing chart showing a modification example of the first synchronization control shown in FIG. 3.

FIG. 5 is a timing chart showing a modification example of the first synchronization control shown in FIG. 3. The timing chart shown in FIG. 5 is different from that in FIG. 3 in that the system controller 11 causes the imaging element drive unit 10 to perform global reset driving (straight GR) between the time point t1 after receiving the instruction of continuous imaging and the time point t2a at which the exposure of the first frame is started.

The global reset driving is driving for simultaneously resetting all the pixels 61 to be exposed on the imaging surface 60 of the imaging element 5. Between the time point t1 and the time point t2a, the system controller 11 instructs the imaging element drive unit 10 to perform the global reset driving, and the imaging element drive unit 10 that receives the instruction performs the global reset driving.

In such a manner, by performing the global reset driving before the start of the exposure of the first frame, in a state where residual charge in the pixel 61 generated in the imaging for live view image display performed before the time point t1 is eliminated, exposure of the first frame can be started. As a result, a quality of the captured image data can be improved.

The residual charge in the pixel 61 tends to be generated in a case where a temperature of the imaging element 5 is low. Therefore, in a case of performing the first synchronization control, the system controller 11 monitors the temperature of the imaging element 5. The system controller 11 may be configured such that the global reset driving is performed in a case where the temperature is equal to or less than the threshold value and the global reset driving is not performed in a case where the temperature is greater than the threshold value. With such a configuration, the power consumption at the time of the first synchronization control can be reduced.

(Third Modification Example of Digital Camera of Embodiment)

In the modification example, the system controller 11 synchronizes with an external synchronization signal VD2 (for example, a vertical synchronization signal for display generated by the display controller 22a of the display device 22) generated outside the system controller 11, and is able to operate in the external synchronization mode in which the vertical synchronization signal VD1 is generated.

In the external synchronization mode, the system controller 11 matches the second time period T2 in the continuous imaging mode with the period of the external synchronization signal VD2. Then, in a case of operating in the external synchronization mode, the system controller 11 selects and executes the second synchronization control as a synchronization control selected in the continuous imaging mode regardless of the exposure time period EX.

As shown in FIG. 4, the second synchronization control is control in which the vertical synchronization signal VD1 is output at regular intervals every second time period T2 after the imaging instruction is issued. Therefore, in the third modification example, for example, the output timing of the vertical synchronization signal VD1, which is output for the second time after the imaging instruction is issued, is matched with the input timing of the external synchronization signal, which is first input to the system controller 11 after the imaging instruction is issued. Thereby, deviation between the output timing of the vertical synchronization signal VD1 and the output timing of the external synchronization signal can be minimized, and the captured image can be displayed immediately. The timing, at which the vertical synchronization signal VD1 is output, does not have to be completely matched with the timing at which the external synchronization signal VD2 is output. The system controller may perform control such that the vertical synchronization signal VD1 is output after a certain period of time has elapsed from the output of the external synchronization signal VD2.

(Fourth Modification Example of Digital Camera of Embodiment)

In the modification example, the system controller 11 is able to operate in the above-mentioned external synchronization mode. In the external synchronization mode, the system controller 11 matches the second time period T2 in the continuous imaging mode with the period of the external synchronization signal VD2. Further, the system controller 11 determines the first time period T1 in a case of performing the first synchronization control on the basis of the input timing of the first external synchronization signal VD2 after receiving the instruction of continuous imaging.

Figure 6:
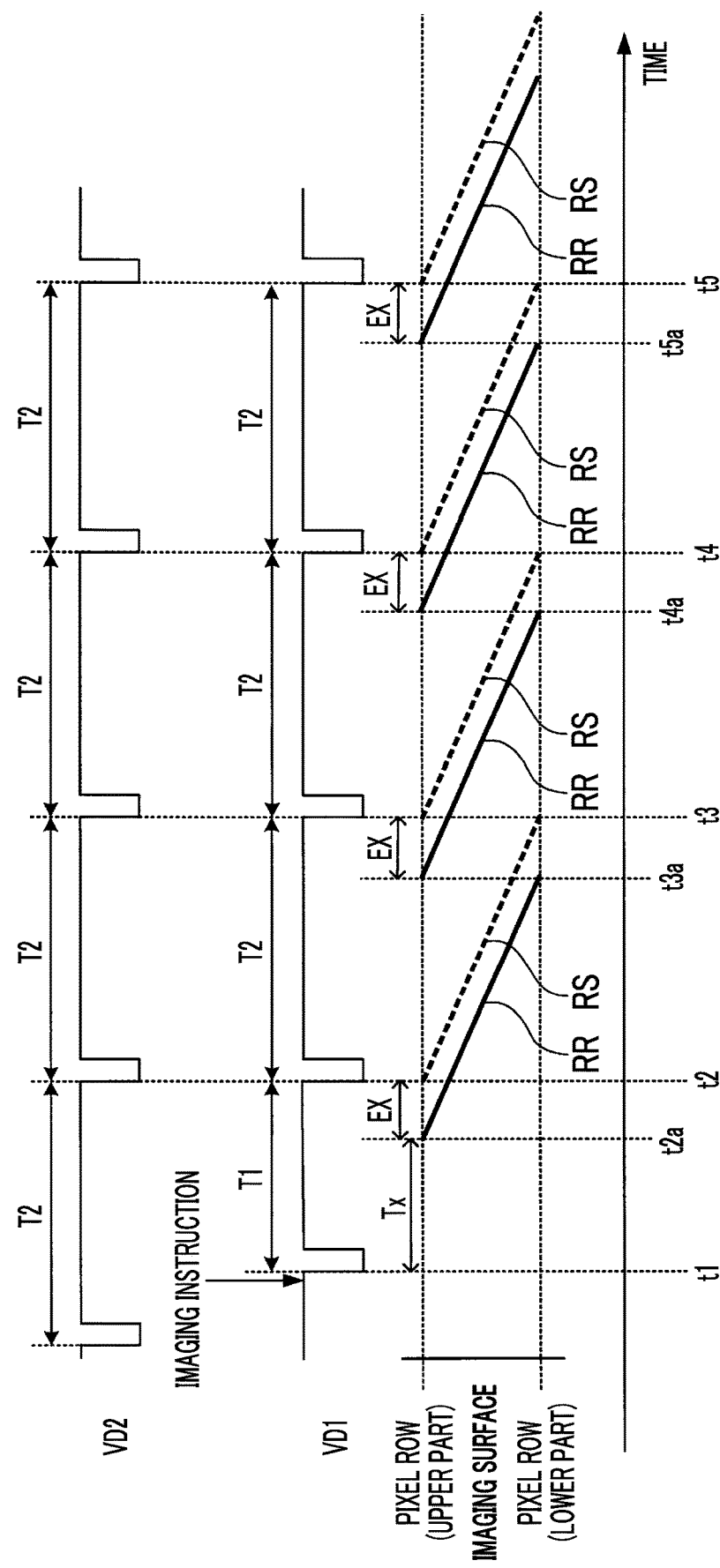
FIG. 6 is a timing chart showing operations during the continuous imaging mode and first synchronization control in a fourth modification example of the digital camera 100 shown in FIG. 1.

FIG. 6 is a timing chart showing operations during the continuous imaging mode and the first synchronization control in the fourth modification example of the digital camera 100 shown in FIG. 1. The external synchronization signal VD2 is shown in the upper part of FIG. 6. The external synchronization signal VD2 is generated at a constant period (second time period T2) and input to the system controller 11.

Among the drive timings of the vertical synchronization signal VD1 and the pixel row 62 of the imaging element 5 shown in FIG. 6, a part at and after the time point t2a is the same as that of FIG. 3. In FIG. 6, a length of the first time period T1 is changed from the example of FIG. 3. In the example of FIG. 6, the system controller 11 outputs the first vertical synchronization signal VD1 at the time point t1 after receiving the imaging instruction. Then, in a case where the system controller 11 first receives the input of the external synchronization signal VD2 after receiving the imaging instruction (time point t2), the system controller 11 outputs the second vertical synchronization signal VD1 after receiving the imaging instruction. That is, in the example of FIG. 6, a time period from the first output of the vertical synchronization signal VD1 obtained in response to the imaging instruction to the first input of the external synchronization signal VD2 is set as the first time period T1.

As described above, in the fourth modification example, although the predetermined time period Tx is longer than that in the example of FIG. 3, deviation between the vertical synchronization signal VD1 for signal reading and the external synchronization signal VD2 can be minimized. Therefore, for example, a processed image of each captured image signal can be instantly displayed on the display surface 22b, and the captured image can be confirmed at high speed. Further, although the predetermined time period Tx is slightly longer, it is shorter than in a case where the second synchronization control is performed. Therefore, the shutter time lag can be shortened.

Next, a configuration of a smartphone will be described as another embodiment of the electronic device including an embodiment of the imaging apparatus of the present invention.

Figure 7:
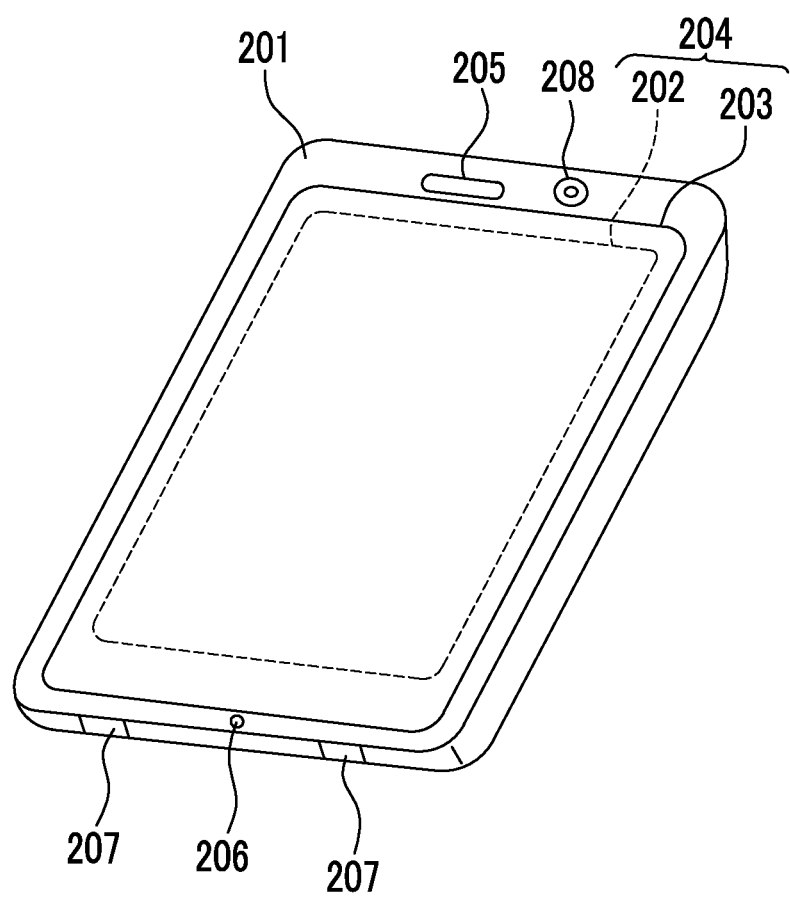
FIG. 7 is a diagram showing an appearance of a smartphone 200 as another embodiment of an electronic device including an embodiment of the imaging apparatus of the present invention.

FIG. 7 is a diagram showing an appearance of a smartphone 200 as another embodiment of the electronic device including an embodiment of the imaging apparatus of the present invention.

The smartphone 200 shown in FIG. 7 comprises: a housing 201 that has a flat plate shape; a display panel 202 as a display surface on one side of the housing 201; and a display input unit 204 into which an operation panel 203 as an input unit is integrated.

Further, the housing 201 comprises a speaker 205, a microphone 206, operating parts 207, and a camera unit 208. It should be noted that the configuration of the housing 201 is not limited to this. For example, it may be possible to adopt a configuration in which the input unit and the display surface are independent, or it may be possible to adopt a configuration having a slide mechanism or a folded structure.

Figure 8:
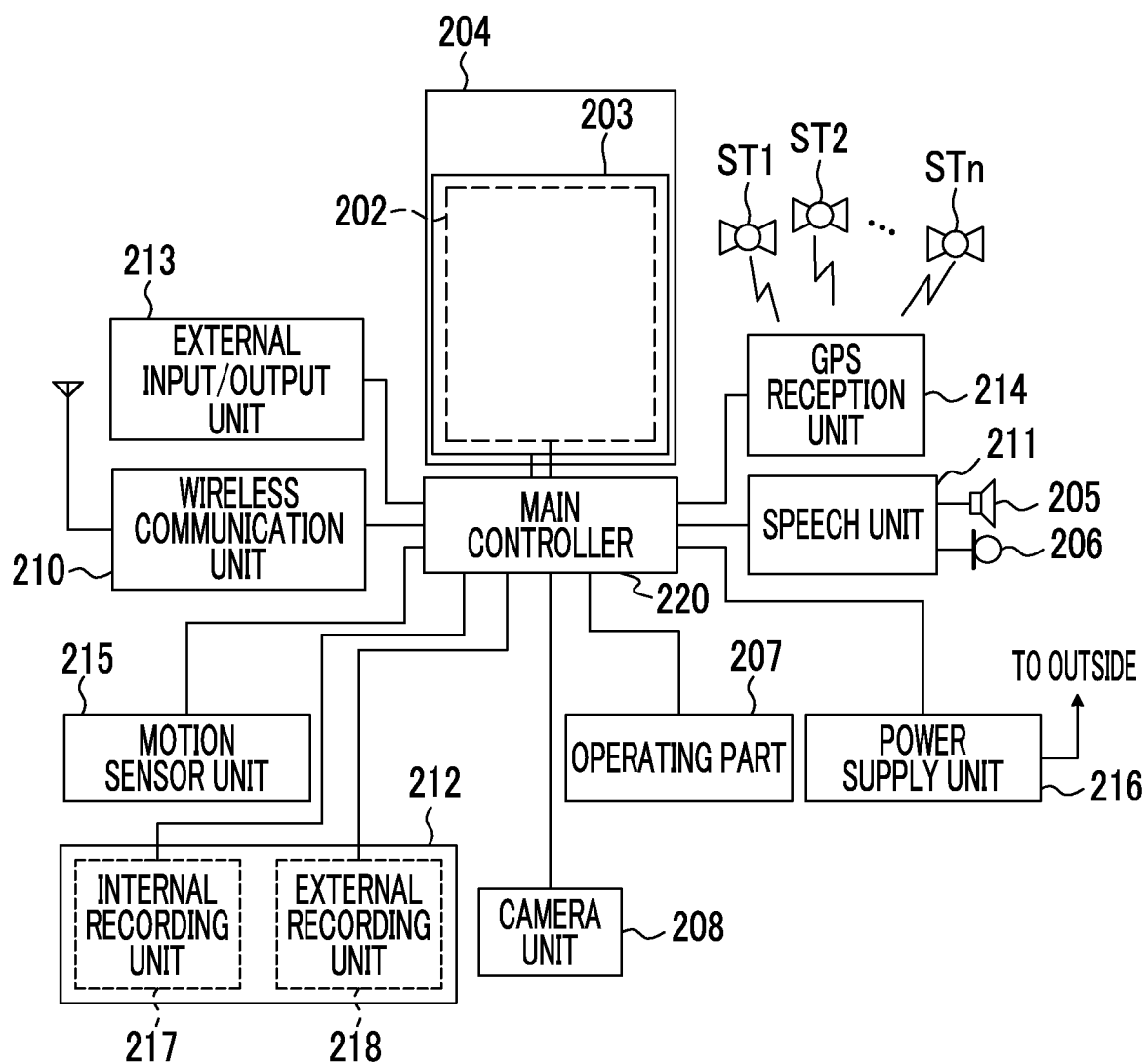
FIG. 8 is a block diagram showing a configuration of the smartphone 200 shown in FIG. 7.

FIG. 8 is a block diagram showing a configuration of the smartphone 200 shown in FIG. 7.

As shown in FIG. 8, the smartphone comprises, as main components, a wireless communication unit 210, a display input unit 204, a speech unit 211, the operating parts 207, the camera unit 208, a recording unit 212, an external input/output unit 213, a global positioning system (GPS) reception unit 214, a motion sensor unit 215, a power supply unit 216, and a main controller 220.

As the main function of the smartphone 200, there is provided a wireless communication function for performing mobile wireless communication with a base station device BS, which is not illustrated, through a mobile communication network NW which is not illustrated.

The wireless communication unit 210 performs wireless communication with the base station device BS, which is included in the mobile communication network NW, in accordance with an instruction of the main controller 220. The wireless communication is used to transmit and receive various kinds of file data such as audio data and image data, and e-mail data or to receive web data, streaming data, or the like.

The display input unit 204 is a so-called touch panel, and includes the display panel 202 and the operation panel 203. The touch panel displays image (still image and video) information, text information, or the like so as to visually transfer the information to a user in accordance with control of the main controller 220, and detects a user operation on the displayed information.

The display panel 202 employs a liquid crystal display (LCD), an organic electro-luminescence display (OELD), or the like as a display device.

The operation panel 203 is a device that is provided to be capable of viewing an image which is displayed on a display surface of the display panel 202 and that detects a single pair of coordinates or a plurality of pairs of coordinates at which an operation is performed by a user's finger or a stylus. In a case where such a device is operated by a user's finger or a stylus, the device outputs a detection signal, which is generated by the operation, to the main controller 220. Subsequently, the main controller 220 detects an operation position (coordinates) on the display panel 202, on the basis of the received detection signal.

As shown in FIG. 8, the display panel 202 and the operation panel 203 of the smartphone 200, which is exemplified as the imaging apparatus according to the above-mentioned embodiment of the present invention, are integrated to compose the display input unit 204, and are disposed such that the operation panel 203 completely covers the display panel 202.

In a case where such an arrangement is adopted, the operation panel 203 may have a function of also detecting a user operation in a region other than the display panel 202. In other words, the operation panel 203 may comprise a detection region (hereinafter referred to as a display region) for a part which overlaps with the display panel 202 and a detection region (hereinafter referred to as a non-display region) for the other part at the outer edge which does not overlap with the display panel 202.

It should be noted that a size of the display region and a size of the display panel 202 may completely coincide with each other, but it is not always necessary for both to coincide with each other. Further, the operation panel 203 may include two sensing regions of the outer edge part and the other inside part. A width of the outer edge part is appropriately designed depending on a size of the housing 201 and the like.

In addition, examples of the position detection method adopted for the operation panel 203 may include a matrix switch method, a resistance film method, a surface elastic wave method, an infrared method, an electromagnetic induction method, and an electrostatic capacitance method, and the like, and any method may be adopted.

The speech unit 211 comprises a speaker 205 or a microphone 206. The speech unit 211 converts a sound of a user, which is input through the microphone 206, into audio data, which can be processed in the main controller 220, and outputs the data to the main controller 220, or decodes audio data, which is received by the wireless communication unit 210 or the external input/output unit 213, and outputs the data from the speaker 205.

Further, as shown in FIG. 7, for example, the speaker 205 can be mounted on the same surface as the surface on which the display input unit 204 is provided. In addition, the microphone 206 can be mounted on a side surface of the housing 201.

The operating part 207 is a hardware key using a key switch or the like, and receives an instruction from a user. For example, as shown in FIG. 7, the operating parts 207 are button type switches which are mounted on the side surface of the housing 201 of the smartphone 200. Each switch is turned on in a case where it is pressed by a finger or the like, and is turned off due to restoring force of a spring in a case where the finger is released.

The recording unit 212 stores a control program and control data of the main controller 220, application software, address data in which names, phone numbers, or the like of communication partners are associated, received and transmitted e-mail data, web data which is downloaded by web browsing, and downloaded contents data, and temporarily stores streaming data and the like. Further, the recording unit 212 is composed of an internal recording unit 217, which is built into the smartphone, and an external recording unit 218 which has a slot for an removable external memory.

In addition, each of the internal recording unit 217 and the external recording unit 218 composing the recording unit 212 is implemented by using a storage medium such as a flash memory type, a hard disk type, a multimedia card micro type, or a card type memory (such as a MicroSD (registered trademark) memory), a random access memory (RAM), or a read only memory (ROM).

The external input/output unit 213 has a function of an interface with all external devices connected to the smartphone 200. The external input/output unit 213 is for direct or indirect connection to other external devices through communications (such as universal serial bus (USB) or IEEE1394), or networks (such as the Internet, wireless LAN, Bluetooth (registered trademark), radio frequency identification (RFID), infrared communication (Infrared Data Association: IrDA) (registered trademark), ultra wideband (UWB) (registered trademark), and ZigBee (registered trademark)).

Examples of the external devices connected to the smartphone 200 include a wired/wireless headset, a wired/wireless external charger, a wired/wireless data port, a memory card which is connected through a card socket, a subscriber identity module (SIM) or user identity module (UIM) card, external audio and video devices which are connected through audio and video input/output (I/O) terminals, external audio and video devices which are connected in a wireless manner, a smartphone which is connected in a wired or wireless manner, a personal computer which is connected in a wired or wireless manner, an earphone which is connected in a wired or wireless manner, and the like.

The external input/output unit 213 is able to transfer the data, which is transmitted from such external devices, to the components within the smartphone 200, or to transmit the data within the smartphone 200 to the external devices.

The GPS reception unit 214 receives a plurality of GPS signals, which are transmitted from GPS satellites ST1 to STn, in accordance with instructions of the main controller 220, executes positioning calculation processing on the basis of the received GPS signals, and detects a position formed of a latitude, a longitude, and an altitude of the smartphone 200. The GPS reception unit 214 may detect the position by using position information in a case where it is possible to acquire the position information from the wireless communication unit 210 or the external input/output unit 213 (for example, wireless LAN).

The motion sensor unit 215 includes, for example, a triaxial acceleration sensor, and detects physical movement of the smartphone 200, in accordance with an instruction of the main controller 220. By detecting physical movement of the smartphone 200, an acceleration or a direction of the movement of the smartphone 200 is detected. Such a detection result is output to the main controller 220.

The power supply unit 216 supplies the respective units of the smartphone 200 with electric power, which is stored in a battery (not illustrated), in accordance with an instruction of the main controller 220.

The main controller 220 includes a micro processor, and integrally controls the respective units of the smartphone 200 by performing an operation on the basis of control data and a control program recorded in the recording unit 212. Further, the main controller 220 has an application processing function and a mobile communication control function of controlling the respective units of a communication system in order to perform data communication or sound communication through the wireless communication unit 210.

The application processing function is implemented by an operation of the main controller 220 using application software recorded in the recording unit 212. Examples of the application processing function include: an infrared communication function of performing data communication with counter devices by controlling the external input/output unit 213; an e-mail function of transmitting and receiving e-mails; a web browsing function of browsing web pages; and the like.

Further, the main controller 220 has an image processing function of displaying a video on the display input unit 204 and the like, on the basis of image data (still image or video data) such as received data or downloaded streaming data.

The image processing function means a function of causing the main controller 220 to decode the image data, apply image processing to the decoding result, and display an image on the display input unit 204.

Further, the main controller 220 executes display control for the display panel 202 and operation detection control to detect the user operation through the operating parts 207 and the operation panel 203.

Through execution of the display control, the main controller 220 displays an icon for activating application software or a software key such as a scroll bar, or (displays) a window for creating an e-mail.

In addition, the scroll bar means a software key for receiving an instruction to move a display portion of an image on a large image which cannot be entirely illustrated in the display region of the display panel 202.

Further, through execution of the operation detection control, the main controller 220 detects the user operation performed through the operating part 207, receives an operation performed on the icon and a text input performed in an input field of the window through the operation panel 203, or receives a request to scroll a displayed image through the scroll bar.

Furthermore, the main controller 220 has a touch panel control function performed through execution of the operation detection control. The function determines whether the operation position of the operation panel 203 is in the overlapping part (display region) which overlaps with the display panel 202 or the other part (non-display region) at the outer edge which does not overlap with the display panel 202, and controls the display position of the software key or the sensing region of the operation panel 203.

In addition, the main controller 220 may detect a gesture operation performed on the operation panel 203, and may execute a preset function in response to the detected gesture operation.

The gesture operation is not a simple touch operation used in the past. The gesture operation means an operation for drawing a locus with a finger or the like, an operation of specifying a plurality of positions at the same time, or an operation of drawing loci from at least one of a plurality of positions as a combination of the above-mentioned operations.

The camera unit 208 includes constituent elements other than the external memory controller 20, the storage medium 21, the display device 22, and the operating part 14 in the digital camera 100 shown in FIG. 1.

The RAW format or JPEG format captured image data generated by the camera unit 208 can be recorded in the recording unit 212 instead of the storage medium 21 or can be output through the external input/output unit 213 or the wireless communication unit 210.

In the smartphone 200 shown in FIG. 7, the camera unit 208 is mounted on the same side as the display input unit 204. However, the mounting position of the camera unit 208 is not limited to this. The camera unit 208 may be mounted on the rear side of the display input unit 204.

Further, the camera unit 208 can be used in various functions of the smartphone 200. For example, the image acquired by the camera unit 208 can be displayed on the display panel 202, or the image of the camera unit 208 can be used as one of the operation input of the operation panel 203.

Further, in a case where the GPS reception unit 214 detects a position, the GPS reception unit 214 may detect the position with reference to an image obtained from the camera unit 208. Furthermore, it may be possible to determine a direction of an optical axis of the camera unit 208 of the smartphone 200 or determine a current use environment, using the GPS reception unit 214 in a combination with the triaxial acceleration sensor or without using the triaxial acceleration sensor, with reference to the image acquired from the camera unit 208. Needless to say, the image acquired from the camera unit 208 may be used in the application software.

Otherwise, the position information acquired by the GPS reception unit 214, the sound information acquired by the microphone 206 (or text information obtained through sound text conversion performed by the main controller or the like), posture information acquired by the motion sensor unit 215, and the like may be added to the image data of the still image or the video, and the image data may be recorded in the recording unit 212, or may be output through the external input/output unit 213 or the wireless communication unit 210.

Even in the smartphone 200 having the above-mentioned configuration, the shutter time lag can be shortened in the continuous imaging mode.

As described above, the present description discloses the following items.

(1)

An imaging apparatus comprising:

a controller that performs first synchronization control of outputting a first synchronization signal at a first timing after receiving an instruction of continuous imaging, outputting a second synchronization signal at a second timing after elapse of a first time period from the first timing, and outputting the second synchronization signal every time a second time period longer than the first time period elapses after the second timing; and an imaging unit that starts reading of a signal from an imaging element by a rolling shutter method at a timing at which an input of the second synchronization signal is received after the second timing, and starts exposure of the imaging element by the rolling shutter method at a timing before an exposure time period of the timing at which the input of the second synchronization signal is received.

(2)

In the imaging apparatus according to (1), the first synchronization signal and the second synchronization signal are transmitted through the same signal line.

(3)

In the imaging apparatus according to (1) or (2), the controller selectively performs the first synchronization control and a second synchronization control of outputting the first synchronization signal after receiving an instruction of continuous imaging and outputting the second synchronization signal every time the second time period elapses after the outputting of the first synchronization signal, and in a case of performing the second synchronization control, the imaging unit starts reading of a signal from the imaging element by a rolling shutter method at a timing at which an input of the second synchronization signal is received, and starts exposure of the imaging element by the rolling shutter method at a timing before an exposure time period of the timing at which the input of the second synchronization signal is received.

(4)

In the imaging apparatus according to (3), the controller selects either the first synchronization control or the second synchronization control on the basis of the exposure time period.

(5)

In the imaging apparatus according to (4), the controller performs the first synchronization control in a case where the exposure time period is equal to or less than a threshold value.

(6)

In the imaging apparatus according to (4) or (5), in a case where the continuous imaging has distribution in the exposure time period in a light-receiving surface of the imaging element, the controller sets a maximum value of the exposure time period in the light-receiving surface, as the exposure time period used for selecting the first synchronization control and the second synchronization control.

(7)

In the imaging apparatus according to any one of (3) to (6), a flicker detection unit that detects flicker is provided, and in a case where the flicker is detected, the controller causes the imaging unit to drive the imaging element under a drive condition for preventing image quality deterioration caused by the flicker, and performs the second synchronization control.

(8)

In the imaging apparatus according to any one of (3) to (6), the controller performs the second synchronization control in a mode in which the second time period is matched with a cycle of an external synchronization signal generated externally.

(9)

In the imaging apparatus according to any one of (3) to (6), in a mode in which the second time period is matched with a cycle of an external synchronization signal generated externally, the controller determines the first time period on the basis of an input timing of the first external synchronization signal after receiving the instruction.

(10)

In the imaging apparatus according to any one of (1) to (9), the controller resets all the pixels of the imaging element all at once from the first timing to start of first exposure of the imaging element in a case of performing the first synchronization control.

(11)

In the imaging apparatus according to any one of (1) to (9), in a case where a temperature of the imaging element is equal to or less than a threshold value and in a case of performing the first synchronization control, the controller resets all pixels of the imaging element all at once from the first timing to start of first exposure of the imaging element.

(12)

In the imaging apparatus according to any one of (1) to (11), the controller controls the first time period on the basis of the exposure time period.

(13)

In the imaging apparatus according to any one of (1) to (12), the controller controls a lower limit value of a time period obtained by subtracting the exposure time period from the first time period.

(14)

In the imaging apparatus according to (13), the controller controls the lower limit value in accordance with a processing load.

(15)

In the imaging apparatus according to (13), the controller controls the lower limit value in accordance with a processing load of the imaging unit.

(16)

An imaging method comprising:

a control step of performing first synchronization control of outputting a first synchronization signal at a first timing after receiving an instruction of continuous imaging, outputting a second synchronization signal at a second timing after elapse of a first time period from the first timing, and outputting the second synchronization signal every time a second time period longer than the first time period elapses after the second timing; and an imaging step of starting reading of a signal from an imaging element by a rolling shutter method at a timing at which an input of the second synchronization signal is received after the second timing, and starting exposure of the imaging element by the rolling shutter method at a timing before an exposure time period of the timing at which the input of the second synchronization signal is received.

(17)

In the imaging method according to (16), the first synchronization signal and the second synchronization signal are transmitted through the same signal line.

(18)

In the imaging method according to (16) or (17), in the control step, the first synchronization control and a second synchronization control are selectively performed, the second synchronization control outputting the first synchronization signal after receiving an instruction of continuous imaging and outputting the second synchronization signal every time the second time period elapses after the outputting of the first synchronization signal, and in the imaging step, in a case of performing the second synchronization control, reading of a signal from the imaging element starts by a rolling shutter method at a timing at which an input of the second synchronization signal is received, and exposure of the imaging element starts by the rolling shutter method at a timing before an exposure time period of the timing at which the input of the second synchronization signal is received.

(19)

In the imaging method according to (18), in the control step, either the first synchronization control or the second synchronization control is selected on the basis of the exposure time period.

(20)

In the imaging method according to (19), in the control step, the first synchronization control is performed in a case where the exposure time period is equal to or less than a threshold value.

(21)

In the imaging method according to (19) or (20), in a case where the continuous imaging has distribution in the exposure time period in a light-receiving surface of the imaging element, in the control step, a maximum value of the exposure time period in the light-receiving surface is set as the exposure time period used for selecting the first synchronization control and the second synchronization control.

(22)

In the imaging method according to any one of (18) to (21), a flicker detection step of detecting flicker is provided, and in the control step, in a case where the flicker is detected, the imaging element is driven under a drive condition for preventing image quality deterioration caused by the flicker, and the second synchronization control is performed.

(23)

In the imaging method according to any one of (18) to (21), in the control step, the second synchronization control is performed in a mode in which the second time period is matched with a cycle of an external synchronization signal generated outside a controller that performs the control step.

(24)

In the imaging method according to any one of (18) to (21), in the control step, in a mode in which the second time period is matched with a cycle of an external synchronization signal generated outside a controller that performs the control step, the first time period is determined on the basis of an input timing of the first external synchronization signal after the instruction is received.

(25)

In the imaging method according to any one of (16) to (24), in the control step, all the pixels of the imaging element are reset all at once from the first timing to start of first exposure of the imaging element in a case of performing the first synchronization control.

(26)

In the imaging method according to any one of (16) to (24), in the control step, in a case where a temperature of the imaging element is equal to or less than a threshold value and in a case of performing the first synchronization control, all pixels of the imaging element are reset all at once from the first timing to start of first exposure of the imaging element.

(27)

In the imaging method according to any one of (16) to (26), in the control step, the first time period is controlled on the basis of the exposure time period.

(28)

In the imaging method according to any one of (16) to (27), in the control step, a lower limit value of a time period obtained by subtracting the exposure time period from the first time period is controlled.

(29)

In the imaging method according to (28), in the control step, the lower limit value is controlled in accordance with a processing load of a controller that performs the control step.

(30)

In the imaging method according to (28), in the control step, the lower limit value is controlled in accordance with a processing load of an imaging unit that performs the imaging step.

(31)

An imaging program causing a computer to execute:

a control step of performing first synchronization control of outputting a first synchronization signal at a first timing after receiving an instruction of continuous imaging, outputting a second synchronization signal at a second timing after elapse of a first time period from the first timing, and outputting the second synchronization signal every time a second time period longer than the first time period elapses after the second timing; and an imaging step of starting reading of a signal from an imaging element by a rolling shutter method at a timing at which an input of the second synchronization signal is received after the second timing, and starting exposure of the imaging element by the rolling shutter method at a timing before an exposure time period of the timing at which the input of the second synchronization signal is received.

Although various embodiments have been described above with reference to the drawings, it is needless to say that the present invention is not limited to such examples. It is apparent to those skilled in the art that various variations or modifications can be made within the scope of the claims, and it should be understood that such variations or modifications belong to the technical scope of the invention. Further, each component in the above-mentioned embodiment may be arbitrarily combined without departing from the spirit of the invention.

This application is based on a Japanese patent application filed on Aug. 27, 2019 (JP2019-154882), the contents of which are incorporated herein by reference.

EXPLANATION OF REFERENCES

100: digital camera
100A: body part
40: lens device
1: imaging lens
2: stop
4: lens controller
8: lens drive unit
9: stop drive unit
50: imaging unit
5: imaging element
10: imaging element drive unit
60: imaging surface
61: pixel
62: pixel row
63: drive circuit
64: signal processing circuit
11: system controller
14: operating part
15: memory controller
16: memory
17: digital signal processing unit
20: external memory controller
21: storage medium
22: display device
22a: display controller
22b: display surface
24: control bus
25: data bus
RR, RS, GR: straight line
EX: exposure time period
Tx, Ty, Tz: predetermined time period
T1: first time period
T2: second time period
VD1: vertical synchronization signal
VD2: external synchronization signal
200: smartphone
201: housing
202: display panel
203: operation Panel
204: display input unit
205: speaker
206: microphone
207: operating part
208: camera unit
210: wireless communication unit
211: speech unit
212: recording unit
213: external input/output unit
214: GPS reception unit
215: motion sensor unit
216: power supply unit
217: internal recording unit
218: external recording unit
220: main controller
ST1 to STn: GPS satellite

What is claimed is:

1. An imaging apparatus comprising:
a controller that performs first synchronization control of outputting a first synchronization signal at a first timing after receiving an instruction of continuous imaging, outputting a second synchronization signal at a second timing after elapse of a first time period from the first timing, and outputting the second synchronization signal every time a second time period longer than the first time period elapses after the second timing; and
an imaging unit that starts reading of a signal from an imaging element by a rolling shutter method at a third timing at which an input of the second synchronization signal is received after the second timing, and starts exposure of the imaging element by the rolling shutter method at a fourth timing before the third timing so that a time interval between the fourth timing and the third timing is equal to a time length of an exposure time period.

2. The imaging apparatus according to claim 1, wherein the first synchronization signal and the second synchronization signal are transmitted through a same signal line.

3. The imaging apparatus according to claim 1,
wherein the controller selectively performs the first synchronization control and a second synchronization control of outputting the first synchronization signal after receiving an instruction of continuous imaging and outputting the second synchronization signal every time the second time period elapses after the outputting of the first synchronization signal, and
wherein in a case of performing the second synchronization control, the imaging unit starts reading of a signal from the imaging element by a rolling shutter method at a fifth timing at which an input of the second synchronization signal is received, and starts exposure of the imaging element by the rolling shutter method at a sixth timing before the fifth timing so that a time interval between the sixth timing and the fifth timing is equal to a time length of an exposure time period.

4. The imaging apparatus according to claim 3,
wherein the controller selects either the first synchronization control or the second synchronization control based on the exposure time period.

5. The imaging apparatus according to claim 4,
wherein the controller performs the first synchronization control in a case where the exposure time period is equal to or less than a threshold value.

6. The imaging apparatus according to claim 4,
wherein in a case where the continuous imaging has distribution in the exposure time period in a light-receiving surface of the imaging element, the controller sets a maximum value of the exposure time period in the light-receiving surface, as the exposure time period used for selecting the first synchronization control and the second synchronization control.

7. The imaging apparatus according to claim 3, further comprising
a flicker detection unit that detects flicker,
wherein in a case where the flicker is detected, the controller causes the imaging unit to drive the imaging element under a drive condition for preventing image quality deterioration caused by the flicker, and performs the second synchronization control.

8. The imaging apparatus according to claim 3,
wherein the controller performs the second synchronization control in a mode in which the second time period is matched with a cycle of an external synchronization signal generated externally.

9. The imaging apparatus according to claim 3,
wherein in a mode in which the second time period is matched with a cycle of an external synchronization signal generated externally, the controller determines the first time period based on an input timing of the external synchronization signal which has been firstly input after receiving the instruction.

10. The imaging apparatus according to claim 1,
wherein the controller resets all of pixels of the imaging element all at once from the first timing to start of first exposure of the imaging element in a case of performing the first synchronization control.

11. The imaging apparatus according to claim 1,
wherein in a case where a temperature of the imaging element is equal to or less than a threshold value and in a case of performing the first synchronization control, the controller resets all of pixels of the imaging element all at once from the first timing to start of first exposure of the imaging element.

12. The imaging apparatus according to claim 1,
wherein the controller controls the first time period based on the exposure time period.

13. The imaging apparatus according to claim 1,
wherein the controller controls a lower limit value of a time period obtained by subtracting the exposure time period from the first time period.

14. The imaging apparatus according to claim 13,
wherein the controller controls the lower limit value in accordance with a processing load.

15. The imaging apparatus according to claim 13,
wherein the controller controls the lower limit value in accordance with a processing load of the imaging unit.

16. An imaging method comprising:
a control step of performing first synchronization control of outputting a first synchronization signal at a first timing after receiving an instruction of continuous imaging, outputting a second synchronization signal at a second timing after elapse of a first time period from the first timing, and outputting the second synchronization signal every time a second time period longer than the first time period elapses after the second timing; and
an imaging step of starting reading of a signal from an imaging element by a rolling shutter method at a third timing at which an input of the second synchronization signal is received after the second timing, and starting exposure of the imaging element by the rolling shutter method at a fourth timing before the third timing so that a time interval between the fourth timing and the third timing is equal to a time length of an exposure time period.

17. The imaging method according to claim 16,
wherein the first synchronization signal and the second synchronization signal are transmitted through a same signal line.

18. The imaging method according to claim 16,
wherein in the control step, the first synchronization control and a second synchronization control are selectively performed, the second synchronization control outputting the first synchronization signal after receiving an instruction of continuous imaging and outputting the second synchronization signal every time the second time period elapses after the outputting of the first synchronization signal, and
wherein in the imaging step, in a case of performing the second synchronization control, reading of a signal from the imaging element starts by a rolling shutter method at a fifth timing at which an input of the second synchronization signal is received, and exposure of the imaging element starts by the rolling shutter method at a sixth timing before the fifth timing so that a time interval between the sixth timing and the fifth timing is equal to a time length of an exposure time period.

19. The imaging method according to claim 18,
wherein in the control step, either the first synchronization control or the second synchronization control is selected based on the exposure time period.

20. The imaging method according to claim 19,
wherein in the control step, the first synchronization control is performed in a case where the exposure time period is equal to or less than a threshold value.

21. The imaging method according to claim 19,
wherein in a case where the continuous imaging has distribution in the exposure time period in a light-receiving surface of the imaging element, in the control step, a maximum value of the exposure time period in the light-receiving surface is set as the exposure time period used for selecting the first synchronization control and the second synchronization control.

22. The imaging method according to claim 18, further comprising
a flicker detection step of detecting flicker,
wherein in the control step, in a case where the flicker is detected, the imaging element is driven under a drive condition for preventing image quality deterioration caused by the flicker, and the second synchronization control is performed.

23. The imaging method according to claim 18,
wherein in the control step, the second synchronization control is performed in a mode in which the second time period is matched with a cycle of an external synchronization signal generated outside a controller that performs the control step.

24. The imaging method according to claim 18,
wherein in the control step, in a mode in which the second time period is matched with a cycle of an external synchronization signal generated outside a controller that performs the control step, the first time period is determined based on an input timing of the external synchronization signal which has been firstly input after the instruction is received.

25. The imaging method according to claim 16,
wherein in the control step, all of pixels of the imaging element are reset all at once from the first timing to start of first exposure of the imaging element in a case of performing the first synchronization control.

26. The imaging method according to claim 16,
wherein in the control step, in a case where a temperature of the imaging element is equal to or less than a threshold value and in a case of performing the first synchronization control, all of pixels of the imaging element are reset all at once from the first timing to start of first exposure of the imaging element.

27. The imaging method according to claim 16,
wherein in the control step, the first time period is controlled based on the exposure time period.

28. The imaging method according to claim 16,
wherein in the control step, a lower limit value of a time period obtained by subtracting the exposure time period from the first time period is controlled.

29. The imaging method according to claim 28,
wherein in the control step, the lower limit value is controlled in accordance with a processing load of a controller that performs the control step.

30. The imaging method according to claim 28,
wherein in the control step, the lower limit value is controlled in accordance with a processing load of an imaging unit that performs the imaging step.

31. A non-transitory computer readable medium storing an imaging program causing a computer to execute:
a control step of performing first synchronization control of outputting a first synchronization signal at a first timing after receiving an instruction of continuous imaging, outputting a second synchronization signal at a second timing after elapse of a first time period from the first timing, and outputting a second synchronization signal every time the second time period longer than the first time period elapses after the second timing; and
an imaging step of starting reading of a signal from an imaging element by a rolling shutter method at a third timing at which an input of the second synchronization signal is received after the second timing, and starting exposure of the imaging element by the rolling shutter method at a fourth timing before the third timing so that a time interval between the fourth timing and the third timing is equal to a time length of an exposure time period.

* * * * *